US011749036B2

(12) United States Patent
Ruf et al.

(10) Patent No.: US 11,749,036 B2
(45) Date of Patent: Sep. 5, 2023

(54) SYSTEM AND METHOD FOR DETERMINING A TIME AT WHICH A VEHICLE FUNCTION OF A VEHICLE IS BROUGHT INTO USE

(71) Applicant: AUDI AG, Ingolstadt (DE)

(72) Inventors: Markus Ruf, Waldstetten (DE); Hannah Staub, Karlsdorf-Neuthard (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/779,348

(22) PCT Filed: Jan. 19, 2021

(86) PCT No.: PCT/EP2021/050987
§ 371 (c)(1),
(2) Date: May 24, 2022

(87) PCT Pub. No.: WO2021/164968
PCT Pub. Date: Aug. 26, 2021

(65) Prior Publication Data
US 2022/0406108 A1 Dec. 22, 2022

(30) Foreign Application Priority Data
Feb. 21, 2020 (DE) ............... 10 2020 104 590.5

(51) Int. Cl.
*G07C 9/00* (2020.01)
(52) U.S. Cl.
CPC .......... *G07C 9/00309* (2013.01); *G07C 2009/00317* (2013.01); *G07C 2009/00769* (2013.01)
(58) Field of Classification Search
None
See application file for complete search history.

(56) References Cited

U.S. PATENT DOCUMENTS

| 7,145,507 B2 * | 12/2006 | Luo | ........... G01S 19/34 |
| | | | 342/357.34 |
| 2008/0165033 A1 * | 7/2008 | Chieu | ........... G08G 1/205 |
| | | | 340/990 |

(Continued)

FOREIGN PATENT DOCUMENTS

| CN | 105365773 A | 3/2016 |
| CN | 110667513 A | 1/2020 |

(Continued)

OTHER PUBLICATIONS

International Search Report dated Apr. 19, 2021 for International Application No. PCT/EP2021/050987.

(Continued)

*Primary Examiner* — Carlos Garcia
(74) *Attorney, Agent, or Firm* — STAAS & HALSEY LLP

(57) ABSTRACT

At least one vehicle and at least one key element, each associated with a corresponding vehicle, are configured to exchange data with one another via a system that determines the vehicle position and the position of the key element. The system places the vehicle in a driving operating mode when the vehicle position and the key element position are essentially the same, in particular when the key element is located inside the vehicle. At least one vehicle function that can be activated when the vehicle is stationary is automatically switched on depending on a current key element position. This may occur when a key element position is changing relative to the vehicle position, but the vehicle and the associated key element are remote from one another, such as separated by at least ten meters.

20 Claims, 3 Drawing Sheets

(56) References Cited

U.S. PATENT DOCUMENTS

2011/0320083 A1\* 12/2011 Nishimura .............. F02D 29/02
 903/905
2018/0099643 A1\* 4/2018 Golsch .................. G01S 13/765

FOREIGN PATENT DOCUMENTS

| DE | 100 46 571 A1 | 5/2002 |
|----|---------------|--------|
| DE | 10 2010 006 149 A1 | 8/2011 |
| DE | 10 2013 220 208 A1 | 4/2015 |
| DE | 10 2013 114 394 A1 | 6/2015 |
| DE | 10 2014 115 250 A1 | 4/2016 |
| DE | 10 2016 206 938 A1 | 10/2017 |
| DE | 10 2017 111 969 A1 | 12/2017 |
| GB | 2551312 A | 12/2017 |
| JP | 2012-80630 | 4/2012 |

OTHER PUBLICATIONS

Translation by WIPO of International Preliminary Report on Patentability for International Appl. No. PCT/ EP2021/050987 dated Sep. 15, 2021.
PCT/EP2021/050987, filed Jan. 19, 2021, Markus Ruf, AUDI AG.
10 2020 104 590.5, filed Feb. 21, 2020, Markus Ruf, AUDI AG.
Office Action dated Nov. 11, 2022 for Chinese Application No. 202180005848.1, with English language summary of Examiner's comments.
Office Action dated May 11, 2023 for Chinese Application No. 202180005848.1, with English language summary of Examiner's Comments.

\* cited by examiner

SYSTEM AND METHOD FOR DETERMINING A TIME AT WHICH A VEHICLE FUNCTION OF A VEHICLE IS BROUGHT INTO USE

CROSS REFERENCE TO RELATED APPLICATIONS

This application is a U.S. national stage of International Application No. PCT/EP2021/050987, filed on Jan. 19, 2021. The International Application claims the priority benefit of German Application No. 10 2020 104 590.5 filed on Feb. 21, 2020. Both the International Application and the German Application are incorporated by reference herein in their entirety.

BACKGROUND

Described below is a system for determining a time at which a vehicle function of a vehicle is brought into use with at least one vehicle; at least one key element that is associated with the or with a vehicle concerned; wherein the vehicle and the associated key element are configured to exchange data with one another, wherein the system is configured to determine the vehicle position and the position of the key element, wherein the system is configured to place the vehicle in a driving operating mode when the vehicle position and the key element position are essentially the same, in particular when the key element is located inside the vehicle.

A method for authenticating a driver in a motor vehicle with a recognition apparatus arranged in the motor vehicle is known from DE 10 2013 114 394 A1.

GB 2551312 A shows a system that controls an energy-saving mode of a vehicle. The system comprises a detector that acquires the presence of a user in a vehicle, and a controller which, on the basis of the acquisition by the detector, determines whether the user is present in the vehicle, and which controls the vehicle in such a way that it enters the energy-saving mode when the user is not in the vehicle.

JP 2012 80630 A shows a vehicle temperature control apparatus with an input control unit and a temperature control unit, both of which are connected to a LAN internal to the vehicle.

SUMMARY

It is desired to provide automated activation of a vehicle function of a vehicle that is stationary, without additional user interaction.

What is thus proposed is a system for determining a time at which a vehicle function of a vehicle is brought into use with at least one vehicle; at least one key element that is associated with the or with a vehicle concerned; wherein the vehicle and the associated key element are configured to exchange data with one another, wherein the system is configured to determine the vehicle position and the position of the key element, wherein the system is configured to place the vehicle in a driving operating mode when the vehicle position and the key element position are essentially the same, in particular when the key element is located inside the vehicle. It is proposed here that the system is further configured to switch on at least one vehicle function that can be activated when the vehicle is stationary automatically depending on a current key element position, in particular on a key element position that is changing relative to the vehicle position, wherein the vehicle and the associated key element are remote from one another, in particular at a distance of at least ten meters from one another.

The time at which the vehicle function is brought into use is determined dynamically with reference to the movement of the key element relative to the vehicle, without a user having to specify in advance a precise time point for switching on the vehicle function. The switching on and the performance of the vehicle function take place automatically, so that the vehicle is prepared for a possible start.

The activatable vehicle function can, in addition, be switched on depending on a probability value, wherein the probability value is determined depending at least on a changing relative position, wherein the relative position is obtained by an ongoing comparison between the vehicle position and the key element position. The inclusion of the probability value, which is a further indicator of whether the vehicle is being brought into use, can entail the activation of one or a plurality of functions of the vehicle functions, in order thus to ensure an optimum preparation of the vehicle before the start and, furthermore, to reduce wear on vehicle components.

The activatable vehicle function can include at least one of the following functions: air-conditioning an interior of the vehicle, charging a battery of the vehicle, and conditioning a fuel cell of the vehicle.

The system can include at least one server device that is configured to exchange data with the vehicle and with the associated key element. The server device can act as an intermediary between the vehicle and the associated key element, so that an exchange of data between the vehicle and the key element can be enabled even over greater distances.

The server device can be configured to calculate the probability value and/or to calculate an anticipated duration until the associated key element has arrived at the vehicle. The computing load on the vehicle and/or the key element can be reduced in this way. The server device can, furthermore, switch on the activatable vehicle function of the vehicle on the basis of the probability value and/or of the anticipated duration.

The vehicle and the key element can be configured to determine the vehicle position and the key element position by a satellite-aided positioning system, in particular GPS, Galileo and the like.

The server device can be configured to carry out the position determination of the vehicle and of the associated key element by further position data such as local maps and/or building information. This permits a more accurate determination of position, and can thus enable an improved calculation of the probability value and/or of the anticipated duration.

The system can be configured to determine the key element position of an associated key element used the last time the vehicle was brought into use with a higher priority. When a plurality of key elements associated with the vehicle are used, the sequence in which the key element positions are determined and corresponding functions of the vehicle function are switched on can thus be regulated.

The system can be configured to store repeating patterns of key element positions and vehicle positions, and to recognize such patterns. Functions of the activatable vehicle function can be switched on and executed in different sequences at different times with reference to these patterns. They can, furthermore, improve the accuracy with which the probability value and/or the anticipated duration are calculated.

The key element can be a vehicle key, a smartphone and/or a key card.

The method determines a time at which a vehicle function is brought into use by determining the vehicle position of a vehicle and the key element position of at least one key element that is associated with the vehicle; exchanging data between the vehicle and the (or an) associated key element concerned; automatically switching on at least one vehicle function that can be activated when the vehicle is stationary depending on a current key element position, in particular on a key element position that is changing relative to the vehicle position, wherein the vehicle and the associated key element are remote from one another, in particular at a distance of at least ten meters from one another.

A probability value and/or an anticipated duration until the associated key element has arrived at the vehicle can further be calculated.

The vehicle position and the key element position can be determined by a satellite-aided positioning system, in particular GPS, Galileo and the like.

The position determination of the vehicle and of the associated key element can be improved by further position data such as local maps and/or building information.

The key element position of an associated key element used the last time the vehicle was brought into use can be determined with a higher priority.

Repeating patterns of key element positions and vehicle positions can be saved, and such patterns recognized.

BRIEF DESCRIPTION OF THE DRAWINGS

Further advantages and details of the system emerge from the following description of exemplary embodiments with reference to the figures. Here:

FIG. 2b shows a simplified and schematic side view of a building illustrated in FIG. 2a.

DETAILED DESCRIPTION

Figure 1:
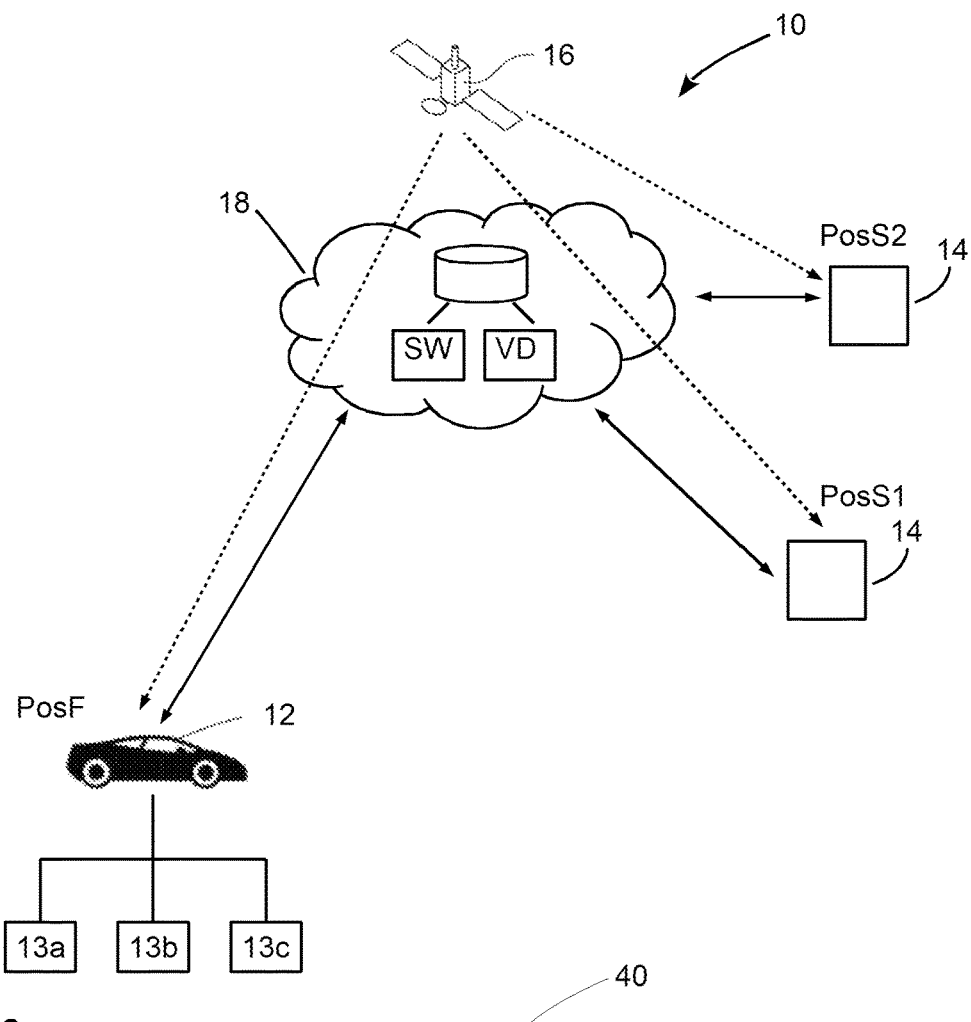
FIG. 1 is a simplified and schematic illustration of the principle of an embodiment of a system for determining a time at which a vehicle function of a vehicle is brought into use.

Reference will now be made in detail to the preferred embodiments, examples of which are illustrated in the accompanying drawings, wherein like reference numerals refer to like elements throughout.

A system 10 is illustrated in a simplified and schematic illustration of the principle of an embodiment in FIG. 1. The system includes a vehicle 12 and at least one key element 14 associated with the vehicle 12. In the illustrated example, two key elements 14 are associated with the vehicle 12.

An exchange of data takes place between the vehicle 12 and the associated key element 14, which is illustrated by the continuously drawn double arrow. The data in particular contain position information PosF, PosS1, PosS2 regarding the vehicle 12 and the key element 14. The data that are exchanged can furthermore contain additional information such as, for example, authentication data associated with a user, the frequency with which the user uses the vehicle 12, the key element activity, the current operating state of the vehicle 12 (interior temperature, battery state etc.) or the like.

The vehicle position PosF and the key element position PosS1, PosS2 are determined by the system 10. When the vehicle position PosF and at least one of the key element positions PosS1, PosS2 are essentially the same, from which, for example, it can be concluded that the key element 14 is located inside the vehicle 12, the vehicle 12 is set into operation.

Furthermore, when the vehicle 12 is stationary, an activatable vehicle function 13a, 13b, 13c is switched on automatically by the system 10 depending on a current key element position PosS1, PosS2, in particular on a key element position PosS1, PosS2 that is changing relative to the vehicle position PosF. The vehicle 12 and the associated key element 14 are here at a distance of at least ten meters from one another.

The determination of the position of the vehicle 12 and of the key element 14 are performed continuously by the system 10, so that a possible start of the vehicle 12 is recognized in good time, and the vehicle function 13a, 13b, 13c appropriately switched on and carried out. The vehicle 12 is thus prepared automatically, without user interaction being necessary.

In one embodiment, the activatable vehicle function 13a, 13b, 13c can also be switched on depending on a probability value SW, wherein the probability value SW is determined depending at least on a changing relative position. The relative position can be obtained by an ongoing comparison between the vehicle position PosF and the key element position PosS1, PosS2. In other words, the probability value SW can depend on the current distance of the key element 14 from the vehicle 12 and/or the speed of the key element 14 relative to the stationary vehicle 12. It can thus be a measure for the probability of starting. As the distance becomes smaller, the probability of a start rises, so that the function(s) to be carried out for the preparation of the vehicle 12 by the vehicle function 13a, 13b, 13c can be activated. Different methods, known to the person skilled in the art, can be used for calculating the probability value SW. Methods based on machine learning, artificial intelligence or the like can, for example, also be applied here. The key elements can, furthermore, also be assigned to users (recognized through driving style, weight, language etc.), and individual probabilities (differing from one another) then determined.

The activatable vehicle function 13a, 13b, 13c can be at least one of the following functions: air conditioning 13a an interior of the vehicle 12, charging 13b a battery of the vehicle 12, and conditioning 13c a fuel cell of the vehicle 12. Further functions, such as for example the automatic switching on of an on-board computer belonging to the vehicle 12, or carrying out appropriate IT applications (activating a route planner, querying the current traffic situation or the like), are also possible. Functions that can be learnt by the system 10 are also possible. For example, a function specially assigned to a key element 14, such as the automatic adjustment of a seat position for a corresponding user can be switched on and executed. The vehicle functions 13a, 13b, 13c can also include functions that depend on the location that can be switched on automatically, depending on where the vehicle 12 and/or the key element 14 are located.

Depending on the key element position PosS1, PosS2 and the probability value SW, one or a plurality of the functions listed above can therefore be activated. For example, charging 13b of the battery of the vehicle 12 can be held off until shortly before the vehicle 12 is started, so that it remains in a state with very little charge for as long as possible while the vehicle 12 is stationary. This can reduce premature ageing of the battery. This function can be switched on when the distance of the key element 14 from the vehicle 12 is small, and the probability of starting correspondingly high. The air-conditioning 13a of the interior of the vehicle 12 can, furthermore, take place at a greater distance and with a lower probability of starting, in order to thus achieve an optimum target temperature at a possible start of the vehicle 12. The conditioning 13c of the fuel cell of the vehicle 12 can also take place in such a way that a high power can be called on when the vehicle 12 starts.

The system 10 can further include a server device 18, as illustrated in FIG. 1, that exchanges data with the vehicle 12 and with the associated key element 14. The server device 18 can continuously receive and store the position data PosF of the vehicle 12 and PosS1, PosS2 of the key element 14 concerned. This allows the movement of the key element 14 to be tracked. The current key element position PosS1, PosS2 can also be transmitted continuously to the vehicle 12 by the server device 18, even when the key element 14 is located at a large distance from the vehicle 12. The server device 18 can function here as an intermediary between the vehicle 12 and the key element 14. Examples of the server device 18 include a cloud service system and/or one or a plurality of server units. This is not, however, restrictive. Further communication and data processing systems are possible.

The probability value SW and/or an anticipated duration VD until the associated key element 14 has arrived at the vehicle 12 can, furthermore, be calculated by the server device 18. The relative distance from the vehicle 12, and thereby the starting probability and/or duration, can be calculated using known methods by the saved key element positions. On the basis of this information, the server device can, for example, transmit a signal to the vehicle 12 in order to switch the vehicle function on automatically "from a distance". This can enable optimal preparation of the vehicle 12 before starting.

In one embodiment, the vehicle 12 and the key element 14 can determine the vehicle position PosF and the key element position PosS1, PosS2 by a satellite-aided positioning system 22, as is shown in FIG. 1, in particular GPS, Galileo and the like. This positioning information can then be transmitted for further processing to the server device 18. With the aid of this position determination, all the key elements 14 associated with the vehicle 12 can be acquired with their position relative to the (stationary) vehicle 12.

Figure 2A:
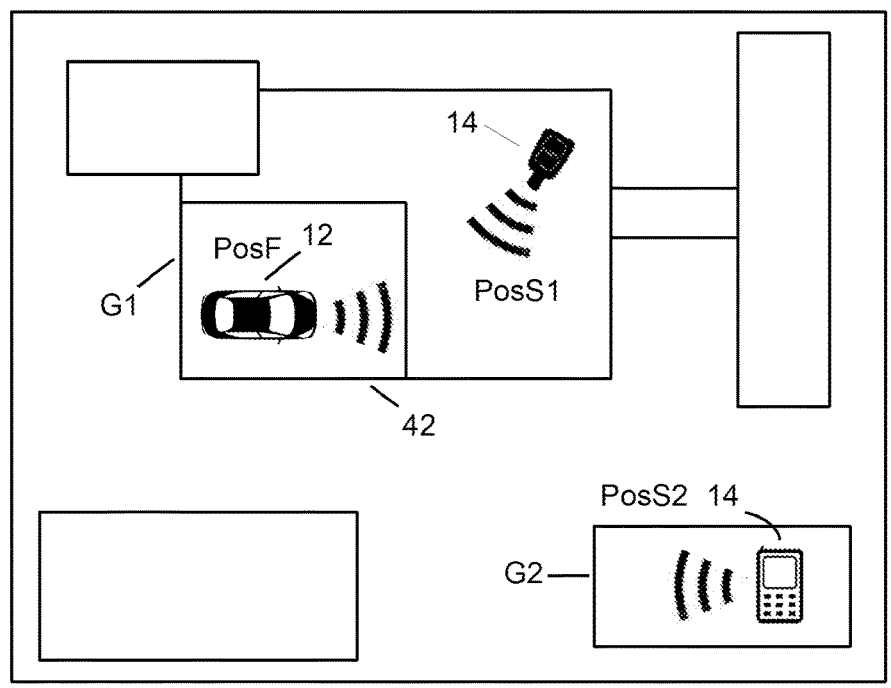
FIG. 2a is a simplified and schematic illustration of a position map.
Figure 2B:
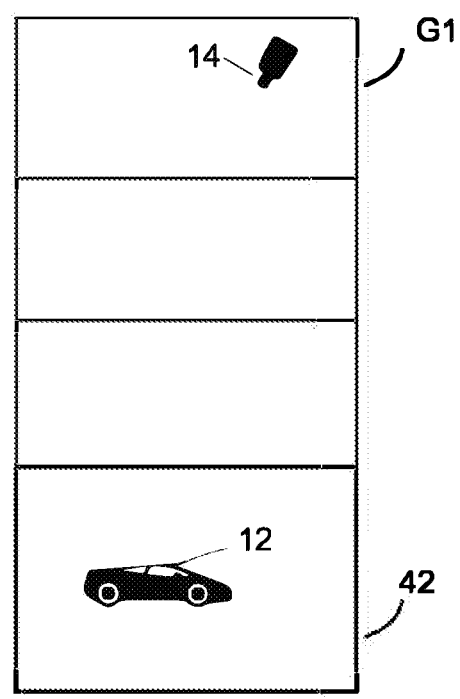

The server device 18 can here improve the position determination of the vehicle 12 and of the associated key element by 14 further position data such as local maps and/or building information. In this context, FIG. 2a shows a simplified and schematic illustration of a plan view of a local position map 40. FIG. 2b shows a simplified and schematic side view of a building G1 illustrated in FIG. 2a with an underground garage. In the illustrated example, a first key element 14 associated with the vehicle 12 can be located in the building G1. A second key element 14 associated with the vehicle 12 can further be located in a building G2. The vehicle 12 can be parked in a parking space, for example in an underground garage 42, as shown in FIG. 2b. In the example shown in FIG. 2b, the first key element 14 is on the third floor of the building G1. The distance that is necessary to arrive at the parking space of the vehicle 12 can, on the basis of the building information, be taken into consideration in the calculation of the probability value SW and/or duration. This makes it possible to determine the time at which the vehicle function 13a, 13b, 13c is brought into use more accurately. As described previously, various functions of the vehicle function 13a, 13b, 13c can also be switched on depending on the vehicle position PosF and/or the key position PosS1, PosS2. It is possible, for example, to recognize by the local position map 40, that the vehicle 12 is located in the underground garage 42. If, for example, it is assumed that it is relatively cool in an underground garage, it may additionally be necessary to activate seat heating, in order to offer improved comfort for a user. Such a scenario is, for example, also conceivable when the vehicle 12 is parked in an outside parking space, and the measured outside temperature is available as additional information.

In one embodiment, the key element position PosS1, PosS2 can be determined with a higher priority for a key element 14 that was used the last time the vehicle 12 was brought into use. If, for example, a plurality of key elements 14 associated with the vehicle 12 are used, as illustrated in FIG. 1 and FIG. 2a, a sequence with which the key element positions PosS1, PosS2 are ascertained and the vehicle function 13a, 13b, 13c switched on can hereby be specified. For example, it is more probable that a most recently used key element 14 (the first key, for example) that is used, in particular regularly during a journey with the vehicle 12 to a business address (to work), will be employed (again) for operation of the vehicle, than another key element 14 (the second key, for example) associated with the vehicle 12, that is, for example, located at a private address of the user (at home).

Other embodiments are possible. A priority can, for example, be assigned on the basis of the frequency with which a key element 14 is used. In a further, non-restrictive, example, the priority can also be assigned depending on the speed with which the key element 14 assigned to the vehicle 12 is moving. This can be done dynamically, so that the key element 14 that is moving fastest (and is thus most likely to reach the vehicle 12 or reach it soonest) always has a high priority. It is also possible that the priority is assigned on the basis of the corresponding distance of the key element 14 from the vehicle 12, so that the key element 14 that is located nearest to the vehicle 12 has a high priority.

Repeating patterns of key element positions PosS1, PosS2 and vehicle positions PosF can also be saved and recognized by the system 10. The functions of the activatable vehicle function 13a, 13b, 13c can be switched on and executed in different sequences at different times with reference to these patterns. Further conclusions relating to user-specific properties can also be drawn from the movement pattern, and a corresponding repertoire of functions thus specially assigned for one key element 14.

The key element 14 can be implemented as a vehicle key, smartphone and/or key card. Further key elements 14 such as for example tablets, laptops etc. are possible.

Figure 3:
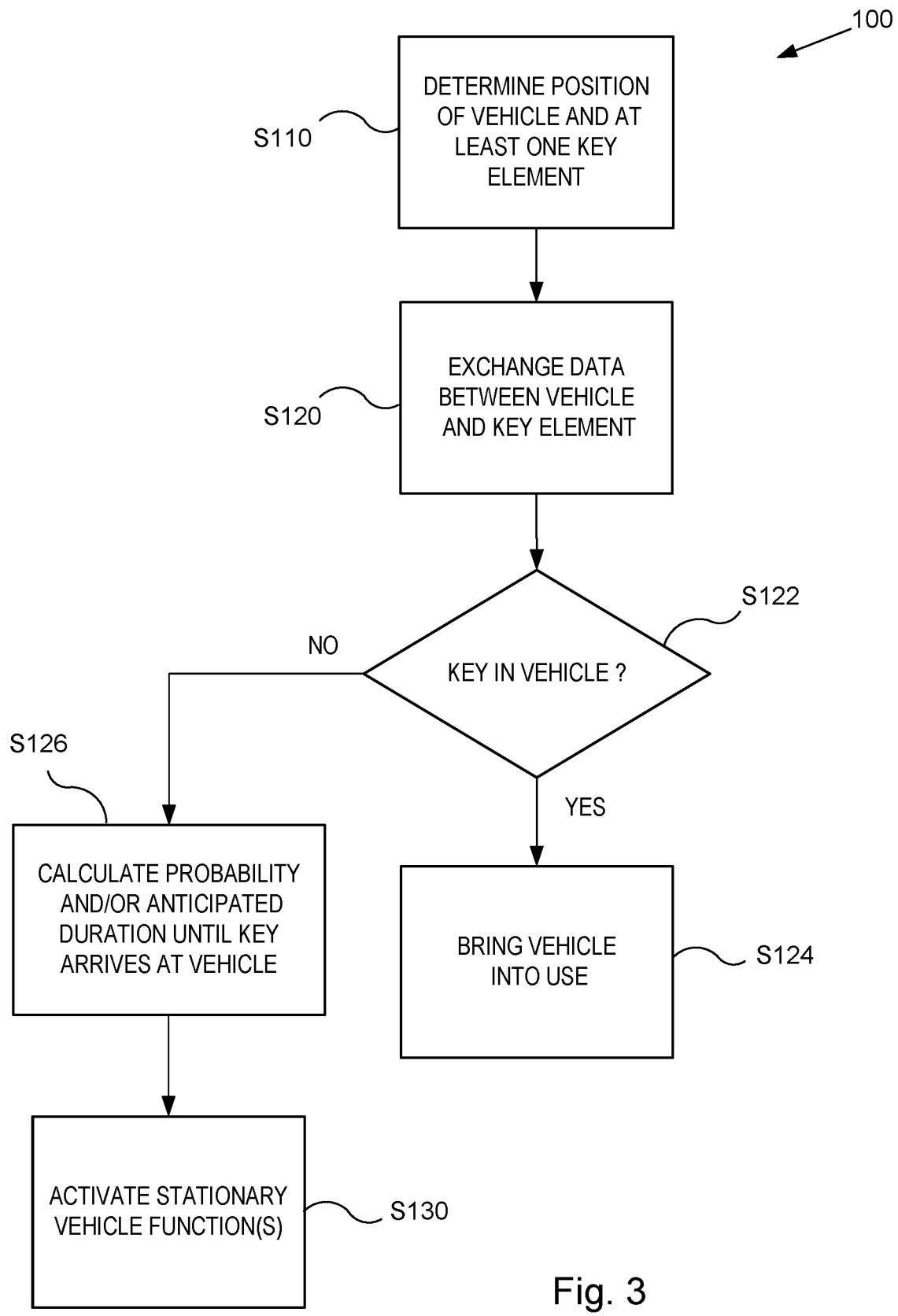
FIG. 3 is a flowchart of an embodiment of a method for determining a time at which a vehicle function is brought into use.

A flowchart of a method 100 for determining the bringing into use of a vehicle function of an embodiment is illustrated in FIG. 3.

In S110, the vehicle position PosF of a vehicle 12, and the key element position PosS1, PosS2 of at least one key element 14 that is associated with the vehicle 12 is determined.

In S120, data are exchanged between the vehicle 12 and the (or an) associated key element 14 concerned. As described above, these data contain the position information PosF, PosS1, PosS2 of the vehicle 12 and the associated key elements 14.

On the basis of the position information PosF, PosS1, PosS2 a determination is made in S122 as to whether a key element 14 associated with the vehicle 12 is located in the vehicle 12. If this is true, the vehicle 12 is brought into use in S124. If none of the key elements 14 associated with the vehicle 12 is located in the vehicle 12, the method moves forwards to S130.

At least one of the vehicle functions 13a, 13b, 13c that can be activated when the vehicle 12 is stationary is switched on automatically in S130, depending on a current key element position PosS1, PosS2, particularly on a changing key element position PosS1, PosS2 relative to the vehicle position PosF. The vehicle 12 and the associated key element 14 are here spaced apart from one another, in particular at a distance of at least ten meters.

In S126, the calculation of a probability value SW, and/or an anticipated duration until the associated key element 14 has arrived at the vehicle 12, can be carried out. On the basis of this probability value SW and/or duration, one or a plurality of functions of the activatable vehicle function 13a, 13b, 13c can be switched on.

The vehicle position PosF and the key element position PosS1, PosS2 can, furthermore, be determined by a satellite-aided positioning system 22, in particular GPS, Galileo and the like. This can be improved through the inclusion of further position data such as local maps and/or building information.

In addition, the key element position PosS1, PosS2 of an associated key element 14 used the last time the vehicle 12 was brought into use can be determined with higher priority.

Repeating patterns of key element positions PosS1, PosS2 and vehicle positions PosF can also be saved and recognized. The functions of the activatable vehicle function 13a, 13b, 13c can be switched on and executed at different times by these patterns.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A system for determining a time at which a vehicle function of a vehicle is brought into use, comprising:
    at least one vehicle;
    at least one key element associated with the at least one vehicle and configured to exchange data therewith; and
    at least one processor configured to
        determine a vehicle position of a respective vehicle and a key position of a corresponding key element;
        place the respective vehicle in a driving operating mode when the vehicle position and the key position are within a minimum distance; and
        automatically switch on at least one vehicle function activatable when the respective vehicle is stationary, depending on the key position changing relative to the vehicle position, the at least one vehicle function being location-dependent on the vehicle position and the key position being separated by at least ten meters, and the key position of an associated key element of the respective vehicle used most recently to bring the vehicle into use is prioritized over any other key element associated with the respective vehicle.

2. The system as claimed in claim 1, wherein the minimum distance indicates that the corresponding key element is located inside the respective vehicle.

3. The system as claimed in claim 2, wherein the at least one processor is configured to switch on the at least one vehicle function depending additionally on a probability value determined based on an ongoing comparison between the vehicle position and the key position.

4. The system as claimed in claim 3, wherein the respective vehicle has an interior, a battery and a fuel cell, and the at least one vehicle function includes at least one of:
    air conditioning the interior of the respective vehicle;
    charging the battery of the respective vehicle; and
    conditioning the fuel cell of the respective vehicle.

5. The system as claimed in claim 4, wherein the at least one processor is in at least one server configured to exchange data with the at least one vehicle and the at least one key element.

6. The system as claimed in claim 5, wherein the server is further configured to calculate at least one of the probability value and an anticipated duration until the corresponding key element has arrived at the respective vehicle.

7. The system as claimed in claim 6, wherein the system receives position signals from a satellite-aided positioning system, and
    wherein the at least one vehicle and the at least one key element are configured to determine the vehicle position and the key position based on the satellite-aided positioning system.

8. The system as claimed in claim 7, wherein the server is configured to refine determination of the vehicle position and the key position based on at least one of local maps and building information.

9. The system as claimed in claim 8,
    further comprising a memory, coupled to the at least one processor, configured to store repeating patterns of key element positions and vehicle positions, and
    wherein the at least one processor is further configured to recognize the repeating patterns.

10. The system as claimed in claim 9, wherein each of the at least one key element is one of a vehicle key, a smartphone and a key card.

11. The system as claimed in claim 1, wherein the system receives position signals from a satellite-aided positioning system, and
    wherein the at least one vehicle and the at least one key element are configured to determine the vehicle position and the key position based on the satellite-aided positioning system.

12. The system as claimed in claim 1, wherein the server is configured to refine determination of the vehicle position and the key position based on at least one of local maps and building information.

13. A computer-implemented method for determining a time at which a vehicle function is brought into use, comprising:
    determining a vehicle position of a vehicle and a key element position of at least one key element associated with the vehicle
    placing the vehicle in a driving operating mode when the vehicle position and the key element position are within a minimum distance;
    exchanging data between the vehicle and the at least one key element;
    automatically switching on at least one vehicle function, activatable when the vehicle is stationary, depending on the key element position changing relative to the vehicle position, the at least one vehicle function being location-dependent on the vehicle position and the key element position being separated by at least ten meters, and the key element position of an associated key element, among at least one key element used most recently to bring the vehicle into use, being prioritized over any other key element associated with the vehicle.

14. The method as claimed in claim 13, wherein the minimum distance indicates that the corresponding key element is located inside the vehicle, and said method further comprises calculating at least one of a probability value and an anticipated duration until the associated key element has arrived at the vehicle.

15. The method as claimed in claim 14, wherein the vehicle position and the key element position are determined based on signals from a satellite-aided positioning system.

16. The method as claimed in claim 15, wherein the determining of the vehicle position and the key element position is refined based on at least one of local maps and building information.

17. The method as claimed in 16, further comprising storing and recognizing repeating patterns of key element positions and vehicle positions.

18. The method as claimed in 14, further comprising storing and recognizing repeating patterns of key element positions and vehicle positions.

19. The method as claimed in claim 13, wherein the vehicle position and the key element position are determined based on signals from a satellite-aided positioning system.

20. The method as claimed in claim 19, wherein the determining of the vehicle position and the key element position is refined based on at least one of local maps and building information.

\* \* \* \* \*

UNITED STATES PATENT AND TRADEMARK OFFICE
CERTIFICATE OF CORRECTION

PATENT NO. : 11,749,036 B2
APPLICATION NO. : 17/779348
DATED : September 5, 2023
INVENTOR(S) : Markus Ruf et al.

Page 1 of 1

It is certified that error appears in the above-identified patent and that said Letters Patent is hereby corrected as shown below:

In the Claims

Column 10, Line 5:
In Claim 17, after "in" insert -- claim --.

Column 10, Line 8:
In Claim 18, after "in" insert -- claim --.

Signed and Sealed this
Fifth Day of November, 2024

Katherine Kelly Vidal
*Director of the United States Patent and Trademark Office*